3,120,999
CYCLIC PROCESS FOR PRODUCING TITANIUM DIOXIDE PIGMENT

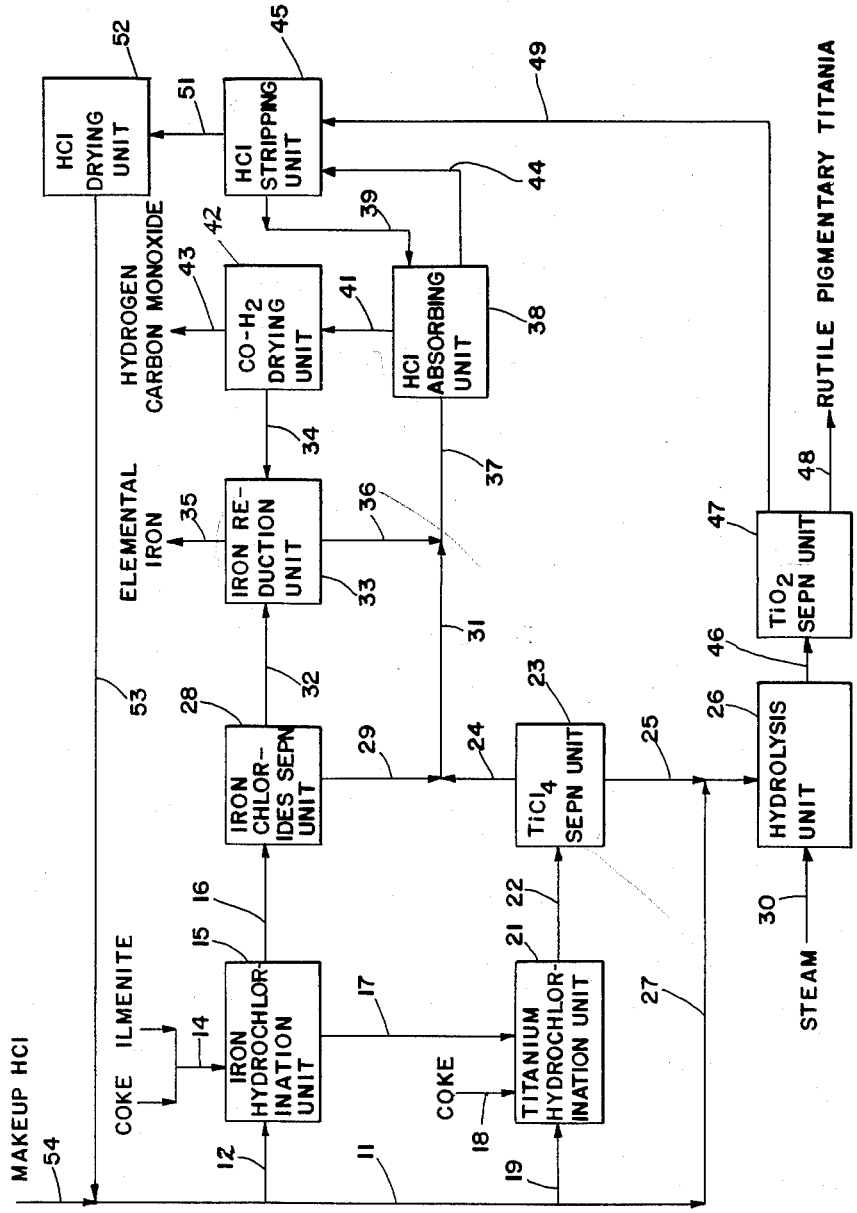

Frank O. Rummery, Baltimore, Joseph D. Richards, Lutherville, Baltimore, and Reuben Roseman, Baltimore, Md., assignors to The Glidden Company, Cleveland, Ohio, a corporation of Ohio
Filed Jan. 29, 1962, Ser. No. 169,459
5 Claims. (Cl. 23—202)

This invention relates to a cyclic process for producing pigmentary rutile titanium dioxide, and more particularly to such process wherein the titaniferous charge is ilmenite.

Advantages of our process over conventional ilmenite processing techniques include avoidance of copperas waste disposal and high yields of valuable, recoverable products and byproducts.

Broadly the process is a cyclic one and it comprises: in stages hydrochlorinating ilmenite in the presence of carbon with hydrogen chloride, the major part of which is recovered from other steps of the process, to form iron chlorides, titanium tetrachloride, and normally gaseous reaction products, at least one stage of the ilmenite hydrochlorinating producing as metal chlorides preponderantly iron chlorides and also forming a partially hydrochlorinated ilmenite residue, and at least one other stage of the hydrochlorinating producing as metal chlorides preponderantly titanium tetrachloride from said partially hydrochlorinated ilmenite residue; separating said normally gaseous resulting reaction products from said respective metal chlorides produced in the foregoing hydrochlorinating stages and from unreacted hydrogen chloride employed in said stages; hydrolyzing in the vapor phase in a hydrolysis zone said titnaium tetrachloride with superheated steam at a temperature of at least about 800° C., using a residence time of at least about 5 seconds in said zone, thereby forming pigmentary rutile titanium dioxide and HCl hydrolysis byproduct; separating said titanium dioxide from the HCl hydrolysis byproduct; converting said iron chlorides into elemental iron and additional HCl byproduct by reacting said iron chlorides with a portion of the separated normally gaseous resulting reaction products; and recycling at least a portion of said additional HCl byproduct, said HCl hydrolysis byproduct, and said unreacted hydrogen chloride as recovered hydrogen chloride into the ilmenite hydrochlorination stages.

The drawing is a flow diagram illustrating the major processing steps of our preferred embodiment. The equipment for the process is conventional, the materials of construction being in the main corrosion-resistant and, where necessary, able to withstand high temperature. Suitable materials of construction include vitreous and ceramic substances and linings of same, impervious graphite, and the like. Heaters and heat exchangers, flow control devices, instruments, comminuting equipment, collection and storage equipment, etc., are not shown, but are understood to be of a conventional nature and installed where necessary or desirable.

An important step in the process for making the rutile titania is the steam hydrolysis operated in accordance with copending patent application S.N. 169,583, filed on even date herewith by Gordon D. Cheever et al., the disclosure of which is incorporated herein by reference. Here, titanium tetrachloride vapor feed is reacted with a superheated steam at a temperature of at least about 800° C., and advantageously 900–950° C., using a residence time of at least about 5 seconds in the hydrolysis reactor whereby pigmentary rutile titanium dioxide and HCl hydrolysis byproduct are formed.

The process will be more clearly understood from the following example which describes the basis for design of a plant processing nominally 150 tons of ilmenite per operating day (t./o.d.). Reference is made to the drawing illustrating the flow of process streams in the example.

EXAMPLE

Finely-ground ilmenite, 148.9 t./o.d., and ground petroleum coke, 185.1 t./o.d., are premixed and passed into iron hydrochlorination unit 15 through inlet 14. Analysis of the ilmenite is as follows:

| | Percent by weight |
|---|---|
| $TiO_2$ | 59.25 |
| Total Fe | 23.46 |
| $Fe^{+++}$ | 19.22 |
| $Fe^{++}$ | 4.75 |
| $SiO_2$ | 1.33 |
| CaO | 1.17 |
| MgO | 1.11 |
| $Al_2O_3$ | 2.27 |
| $Cr_2O_3$ | 0.15 |
| $V_2O_5$ | 0.22 |
| MnO | 0.40 |
| $P_2O_5$ | 0.19 |

Simultaneously, these ground, mixed feeds are contacted with a flow of dry HCl entering unit 15 through inlet 12. The bed of solid reactants formed is in dynamic suspension, a highly turbulent condition as described in U.S. Patent 2,954,274. Hydrochlorinaation at this stage of the operation is maintained at 1000° C. and is carried out until virtually all the iron is removed as iron chlorides (preponderantly ferrous) in the vent gas stream of the unit. The residue from this hydrochlorination stage is almost entirely titanium oxide.

The vent products from unit 15 are withdrawn through outlet 16. They are principally CO, hydrogen, unreacted HCl, and iron chlorides. These vent products are passed into iron chloride separation unit 28 and cooled to 250° C. whereby the iron chlorides precipitate and the uncondensed gases (i.e., CO, hydrogen, HCl) are withdrawn through outlet 29. For convenience herein the CO and hydrogen products from units 15 and 21 are termed "normally gaseous reaction products."

The titanium oxide residue from unit 15 passes through line 17 into titanium hydrochlorination unit 21 together with an additional quantity, 48.1 t./o.d., of finely-ground petroleum coke. These solid feeds are similarly fluidized by a flow of dry hydrogen chloride entering unit 21 through inlet 19. This hydrochlorination stage is operated at 1400° C. whereby the dioxide reacts to yield titanium tetrachloride, carbon monoxide, and hydrogen and other incidental vapor phase products. These products and unreacted HCl are withdrawn through outlet 22 and passed into titanium tetrachloride separation unit 23. Here titanium tetrachloride is separated from the other major components by condensation and is distilled in conventional manner to further purify it preparatory to hydrolysis.

The separated titanium tetrachloride is withdrawn from unit 23 through line 25 and, in the preferred instance, entrained in a stream of dry HCl entering from line 27, the $HCl/TiCl_4$ stream then being passed into hydrolysis unit 26 together with about 2 moles of superheated steam per mol of $TiCl_4$, the steam mole ratio above 2:1 steam: $TiCl_4$ being adjustable to provide makeup for water losses at other points of the process. The steam enters through inlet 30 and impinges on the $TiCl_4$ flow in unit 26. The residence time of the steam and $TiCl_4$ reactants in hydrolysis unit 26 is 9 seconds, this residence time being computed by dividing the volume of the reaction zone by the volumetric rate of the reactant feeds, including diluents, at the reaction zone temperature and pressure.

The temperature of the hydrolysis unit is maintained at 950° C. and the resulting products, a suspension of preponderantly rutile pigmentary titania borne in a stream of excess steam and byproduct and entraining HCl, is withdrawn from unit 26 through line 46 and passed into TiO₂ separation unit 47.

In separation unit 47 rutile pigmentary titania is allowed to settle and is withdrawn through outlet 48 at the rate of 75 t./o.d., for subsequent processing to remove any residual HCl, followed by cooling and comminution in conventional manner by means not shown. The HCl vapor form unit 47 is withdrawn through outlet 49 and passed into HCl stripping unit 45, the operation of which will be described below.

The gas streams from iron chloride separation unit 28 and $TiCl_4$ separation unit 23, containing preponderantly CO, hydrogen, and unreacted HCl, are collected from outlets 29 and 24 respectively, passed into header 31, further augmented by additional HCl byproduct from line 36, and the whole passed through line 37 into HCl absorbing unit 38. Here the hydrogen chloride is absorbed in a lean aqueous hydrochloric acid solution of about 20.3 weight percent HCl content, the lean acid entering absorbing unit 38 through inlet 39.

Rich hydrochloric acid solution, 33% by weight HCl, is withdrawn from absorbing unit 38 through outlet 44 and passed into HCl stripping unit 45. Unabsorbed gases, predominantly carbon monoxide and hydrogen, are withdrawn from unit 38 through outlet 41 and passed into CO—$H_2$ drying unit 42. These gases are dried by contact with 98% sulfuric acid and withdrawn from the system through outlet 43. With further purification and drying in conventional manner these gases can be utilized to synthesize methanol catalytically, or be subjected to a water gas shift reaction over a catalyst in conventional manner for converting carbon monoxide with steam into carbon dioxide and additional hydrogen suitable for separation and further processing into chemicals such as ammonia. A portion of the dried carbon monoxide and hydrogen, however, is withdrawn from unit 42 through line 34 and passed into iron reduction unit 33 for reaction with separated iron chlorides recovered from unit 28.

The iron reduction unit is operated at an average temperature of 750° C.±50° C. and about atmospheric pressure, the iron chlorides being predominantly ferrous and in fine particulate form. In unit 33 the iron chlorides are reduced to elemental iron, 31.4 t./o.d., and withdrawn from the system through outlet 35. The resulting gases, additional hydrogen chloride byproduct, and unreacted carbon monoxide and hydrogen, are withdraw from unit 33 through line 36 and join other HCl-bearing streams flowing through line 37 into HCl absorbing unit 38 as previously described.

HCl stripping unit 45 is fed with the rich aqueous hydrochloric acid from line 44 and the warm, wet HCl-laden hydrolysis byproduct vapors from line 49. Stripping unit 45 is operated to produce essentially the maximum-boiling azeotrope of HCl and water as a bottoms product. This is withdrawn from unit 45 and passed into absorbing unit 38 through line 39 as the lean absorbing solution previously described. Wet, stripped HCl vapors are withdrawn from HCl stripping unit 45 through outlet 51 and passed into HCl drying unit 52 where they are dried by contact with 98% sulfuric acid.

The dried HCl vapors then are withdrawn from unit 52 through line 53 and passed into HCl header 11 together with such makeup HCl, entering line 54, as is necessary to offset the losses of HCl in the process.

For efficiency and economy in the operation the drying of gases as shown is done to obtain a dew point of at least about −40° F. Other suitable desiccants for the process include lithium chloride solutions and silica gel adsorbers. The HCl absorbing and stripping units advantageously are operated at about atmospheric pressure or a slight superatmospheric pressure. Alternatively, however, the major part or at least a portion of the HCl can be recovered by alternative means, e.g., compression and liquefaction of the HCl and separation of the resulting liquid from the less readily condensable hydrogen and carbon monoxide gases. In place of petroleum coke other carbon also can be used, e.g., anthracite, char, or the like, and it is preferred that the carbon used be low in sulfur to minimize formation of sulfurous byproducts.

The titanium tetrachloride fed to the hydrolysis unit need not be entrained in a stream of dried HCl, but can be fed straight or with an inert gas entrainer such as nitrogen, non-reducing flue gas or the like. However, use of the HCl entraining agent is preferred for convenient regulation of titanium tetrachloride flow. It also can provide a slight suppression of the hydrolysis rate in unit 26 whereby crystal growth in the hydrolysis reactor is more readily controlled, and the formation of undesirable plugs and other agglomerative growths in the hydrolysis unit is suppressed.

We claim:
1. A cyclic process for producing pigmentary rutile titania from ilmenite which comprises:
(A) In stages hydrochlorinating ilmenite in the presence of carbon with hydrogen chloride, the major part of which is recovered from other steps of the process, to form iron chlorides, titanium tetrachloride, and normally gaseous reaction products comprising carbon monoxide and hydrogen, at least one stage of the ilmenite hydrochlorinating producing as metal chlorides preponderantly iron chlorides and also forming a partially hydrochlorinated ilmenite residue, and at least one other stage of the hydrochlorinating producing as metal chlorides preponderantly titanium tetrachloride from said partially hydrochlorinated ilmenite residue;
(B) separating said normally gaseous reaction products and unreacted hydrogen chloride employed in the foregoing hydrochlorinating stages defined in step (A) from said respective metal chlorides produced in said stages;
(C) hydrolyzing in the vapor phase in a hydrolysis zone said titanium tetrachloride with superheated steam at a temperature of at least about 800° C., using a residence time of at least about 5 seconds in said zone, thereby forming a pigmentary rutile titanium dioxide and vapor phase hydrogen chloride hydrolysis byproduct;
(D) separating said pigmentary rutile titanium dioxide from the vapor phase hydrogen chloride hydrolysis byproduct;
(E) reducing in an iron reduction zone said iron chlorides to elemental iron and additional vapor phase hydrogen chloride byproduct by reaction with at least a portion of the carbon monoxide and hydrogen from effluent of unabsorbed gases recovered in a later step (H) of the process and withdrawing resulting elemental iron, said additional vapor phase hydrogen chloride byproduct, and unreacted carbon monoxide and hydrogen from said iron reduction zone;
(F) passing into an HCl absorbing zone as vapor phase feeds said separated normally gaseous reaction products and unreacted hydrogen chloride from step (B) and additional vapor phase hydrogen chloride byproduct formed in the iron reduction step (E), and unreacted carbon monoxide and hydrogen withdrawn from said iron reduction step (E);
(G) feeding leaner aqueous hydrochloric acid solution, the bottoms product from the HCl stripping zone of a later step (H) of the process into said HCl absorbing zone and into hydrogen chloride absorbing contact with said vapor phase feeds of step (F), thereby absorbing unreacted hydrogen chloride and additional vapor phase hydrogen chloride byproduct from said vapor phase feeds and forming an enriched aqueous hydrochloric acid solution and an effluent of unabsorbed gases, preponderantly carbon monoxide and hydrogen;

(H) recovering said effluent of unabsorbed gases comprising carbon monoxide and hydrogen from step (G);

(I) passing said enriched aqueous hydrochloric acid solution from step (G) and separated vapor phase hydrogen chloride hydrolysis byproduct from step (D) into stripping contact in an HCl stripping zone, thereby stripping said enriched aqueous hydrochloric acid solution with said vapor phase hydrogen chloride hydrolyses byproduct and obtaining wet, stripper hydrogen chloride vapors for recovery and a bottoms product of leaner aqueous hydrochloric acid solution for recycle to the HCl absorbing zone of step (G);

(J) recovering said wet, stripped hydrogen chloride vapors from the HCl stripping zone of step (I) as recovered hydrogen chloride;

and (K) recycling at least a portion of said recovered hydrogen chloride to the ilmenite hydrochlorination stages of step (A).

2. The process of claim 1 wherein the wet, stripped hydrogen chloride vapors from step (J) are dried before the recycling of step (K).

3. The process of claim 1 wherein the portion of the effluent of unabsorbed gases from step (H) that are used in the iron reduction step (E) are dried before use in said iron reduction zone.

4. The process of claim 1 wherein said bottoms product from step (I) consists essentially of a maximum-boiling azeotrope of hydrogen chloride and water.

5. The process of claim 1 wherein the titanium tetrachloride is passed into said hydrolysis zone in a vehicle of vapor chloride hydrogen chloride recovered from at least one step of the process.

References Cited in the file of this patent

UNITED STATES PATENTS

| | | |
|---|---|---|
| 1,451,399 | Low | Apr. 10, 1923 |
| 1,967,235 | Ferkel | July 24, 1934 |
| 2,184,887 | Muskat et al. | Dec. 26, 1939 |
| 2,245,358 | Pechukas | June 10, 1941 |
| 2,436,432 | Hunter | Feb. 24, 1948 |
| 2,488,440 | Schaumann | Nov. 15, 1949 |
| 2,791,490 | Willcox | May 7, 1957 |

OTHER REFERENCES

J. W. Mellor's, "A Comprehensive Treatise on Inorganic and Theo. Chem.," vol. 14, pages 20 and 70, Longmans, Green and Co. N.Y.

UNITED STATES PATENT OFFICE
CERTIFICATE OF CORRECTION

Patent No. 3,120,999            Febraury 11, 1964

Frank O. Rummery et al.

It is hereby certified that error appears in the above numbered patent requiring correction and that the said Letters Patent should read as corrected below.

Column 1, line 34, for "titnaium" read -- titanium --; column 2, line 26, for "Hydrochlorinaation" read -- Hydrochlorination --; column 3, line 48, for "withdraw" read -- withdrawn --; column 5, lines 13 and 14, for "stripper" read -- stripped --; column 6, line 10, for "chloride", first occurrence, read -- phase --.

Signed and sealed this 7th day of July 1964.

(SEAL)
Attest:

ERNEST W. SWIDER
Attesting Officer

EDWARD J. BRENNER
Commissioner of Patents